United States Patent
Ginn

(10) Patent No.: US 6,275,811 B1
(45) Date of Patent: *Aug. 14, 2001

(54) SYSTEM AND METHOD FOR FACILITATING INTERACTIVE ELECTRONIC COMMUNICATION THROUGH ACKNOWLEDGMENT OF POSITIVE CONTRIBUTIVE

(75) Inventor: Michael R. Ginn, 2258 15th St., San Francisco, CA (US) 94114

(73) Assignee: Michael R. Ginn, San Francisco, CA (US)

(*) Notice: Subject to any disclaimer, the term of this patent is extended or adjusted under 35 U.S.C. 154(b) by 0 days.

(21) Appl. No.: 09/073,919

(22) Filed: May 6, 1998

(51) Int. Cl.[7] .................................................. G06F 17/60

(52) U.S. Cl. .............................................. 705/10; 705/14

(58) Field of Search .................................. 705/14, 1, 10

(56) References Cited

U.S. PATENT DOCUMENTS

| | | | |
|---|---|---|---|
| 4,870,579 | 9/1989 | Hey | 364/419 |
| 4,996,642 | 2/1991 | Hey | 364/419 |
| 5,400,248 | 3/1995 | Chisholm | 364/409 |
| 5,790,426 | * 8/1998 | Robinson | 364/554 |
| 6,064,978 | * 5/2000 | Gardner et al. | 705/10 |
| 6,112,186 | * 8/2000 | Bergh et al. | 705/10 |

FOREIGN PATENT DOCUMENTS

| | | |
|---|---|---|
| 0643359A2 | * 3/1995 | (EP) . |
| 0751471A1 | * 1/1997 | (EP) . |

OTHER PUBLICATIONS

Customer Review Section from Amazon.com. Retreived from Internet [URL: http://www.amazon.com] on Dec. 29, 2000.*

"Amazon.com Catapults Electronic Commerce to Next Level With Powerful New Features," Retrieved from Internet [URL: http://www.iredge.com] on Dec. 29, 2000, Sep. 1997.*

(List continued on next page.)

*Primary Examiner*—Tariq R. Hafiz
*Assistant Examiner*—Susanna Meinecke-Diaz
(74) *Attorney, Agent, or Firm*—Townsend and Townsend and Crew LLP

(57) ABSTRACT

A system and method of authenticating and acknowledging, for each user among a group of users, that the user's behavior is a positive contribution to a context. The authentication of positive contributive behavior is based on feedback from other users of the system. The system and method facilitate such user feedback. In one embodiment, the system and method use user feedback to selectively recommend messages in an electronic bulletin board system. In this embodiment, each user acknowledges positive contributive messages authored by other users. The system validates the acknowledgment by checking its consistency with feedback on the same message received from other users. If the acknowledgment is determined to be valid, the system acknowledges the user supplying feedback by awarding value units (points) to the user. To the extent that the author's message is well received, the system acknowledges the author by awarding points to the author. Preferably, the group of users subscribe to the system or advertisers sponsor the system, creating a pool of resources, part of which can be distributed to users based upon the number of points they earn. Also in the preferred embodiment, the system divides users into groups based upon the similarity of their feedback. Preferably, the system recommends messages to a user based partly upon the feedback from users who provide similar feedback to the same messages. Preferably, the system aggregates and displays the acknowledgment of other behavior contributory toward a group end, for example donating time or money toward a cause.

20 Claims, 7 Drawing Sheets

OTHER PUBLICATIONS

"Amazon.com: Shopping for Books on the Internet Isn't Just for Tech Buyers Anymore," Business Editors, Jun. 1996.*

"Net Perceptions: Net Perceptions Wins 'Best of Class' Award," Business Editors & High Tech Writers, Apr. 1997.*

"The Feedback Forum," Retrieved from Internet [URL: http://pages.ebay.com/services/forum/feedback.htm] on Dec. 29, 2000.*

Turner, Rob, "Winning Bid," Money, vol. 28, No. 3, pp. 201–203, Mar. 1999.*

Schoder, Detlef & Pai–Ling Yin, "Building Firm Trust Online," Association for Computer Machinery, vol. 43, No. 12, pp. 73–79, Dec. 2000.*

"Intellipost Launches BonusMail With 50,000 Members," Retrieved from Internet [URL: http://www.mypointsinc.com] on Jul. 23, 1999, Jun. 1997.*

Experts Exchange, the #1 Knowledge Sharing Community on the Web. Press Releases [online]. Experts Exchange, Inc. [retrieved on Aug. 9, 1999]. Retrieved from the Internet: <URL:www.experts–exchange.com/info/pressrel.htm>.*

Experts Exchange, the #1 Knowledge Sharing Community on the Web. Datasheets [online]. Experts Exchange, Inc. [retrieved on Jul. 28, 1999]. Retrieved from the Internet: <URL:www.experts–exchange.com>.*

"Software Invests in Firefly and Asymetrix", Multimedia Business Analyst, No. 3, p. 6, Nov. 13, 1996.*

Steinberg, Steve G., "Advances Offer Hope for Truly Useful Filters", Los Angeles Times, Home Edition ed., col. D, p. 6, Mar. 25, 1996.*

Advanced Document Rating System Proposal. Datasheets [online]. Message Rating System Proposal by Alexander Chislenko, last updated Jan. 1993 [retrieved on Jul. 28, 1999]. Retrieved from the Internet: <URL: www.lucifer.com/~sasha/articles/MessageRating.html>.*

Advanced Document Rating System Proposal. Datasheets [online]. Message Rating System Proposal by Alexander Chislenko, last updated Jan. 1993 [retrieved on Jul. 28, 1999]. Retrieved from the Internet: <URL: www.lucifer.com/~sasha/articles/MessageRating.*

"Internet: Realize Provides Incentives to Cut Usenet Spam," Network Briefing, p. N/A, Sep. 1998.*

* cited by examiner

SYSTEM AND METHOD FOR FACILITATING INTERACTIVE ELECTRONIC COMMUNICATION THROUGH ACKNOWLEDGMENT OF POSITIVE CONTRIBUTIVE

BACKGROUND OF THE INVENTION

This invention relates to a system and method for facilitating interactive electronic communication through feedback.

In traditional interactive electronic discussion groups, also known as message boards and news groups, users post messages which can be then be read by others in the discussion group. Examples include the Usenet public bulletin board system of the Internet, and the Lotus Notes discussion group software for corporate users.

Discussion groups have been around for more than twenty-five years. Early electronic bulletin boards posted messages from one person on a topic of interest which could then be read by dozens of other people.

Graphical user interfaces have replaced most text-based interfaces, but the basic technology has remained the same. On one system, a person posts a message on a topic of interest, such as Bicycling, C++ programming, or movies. That system copies the message to hundreds of other systems, where anyone interested in that topic could see the message. A message consists of two parts: the headers and the body. The headers include information such as where the message came from, the name of the author, the electronic mail address for the author, the subject of the message, the name of the discussion group to whom the message was intended, and so on. The body of the message contains text, graphics, or binary information relating to the subject.

As the use of the Internet has grown, users of discussion groups have suffered from increasing spurious messages posted to the group which are irrelevant to the topic of discussion or which are undesirable for other reasons. For example, Usenet discussion groups, which can be read by hundreds of thousands of users, are increasingly filling with three types of messages considered noise by most users: commercial messages advertising a product or service which most members of the discussion group would prefer not be in the discussion group, inflammatory messages wherein a group of people engage in heated debate on a topic which is boring to most of the other users of that group, and repetitious questions which are answered in a periodically posted "FAQ" ("answers to Frequently Asked Questions").

Some specialized discussion groups use other mechanisms for computing the utility of proposed messages. For example, Lotus Notes uses sophisticated security techniques to ensure only authorized users can post messages to a particular group. Other discussion groups actually compute the utility of individual messages, but they base the computation of utility upon weighted averages of scaled ratings supplied by readers of the messages.

For example, at Stanford University during 1985–1986, the present inventor created a system which included weighted averages of scaled ratings and deployed it for the purposes of predicting users' valuations of messages, movies, and music they had not yet encountered.

Other examples are U.S. Pat. Nos. 4,870,579 (1987) and 4,996,642 (1989), wherein a system is described for predicting ratings based upon a weighted average of scaled ratings of users who had already seen a set of messages and based upon the similarity of the users' ratings of items which had been rated by both users.

Similarly, the GroupLens research project initially at MIT and then later at the University of Minnesota used weighted averages of scaled ratings to Usenet. The commercial Firefly system provides another example of a system which predicts ratings based upon matching people with similar interest.

Some of these endeavors focus on collaborative filtering, where readers rate articles on a scale of 1 to 10 indicating how good they are. Then, based upon those ratings, similar users are grouped together. If A rates a message and has similar taste to B, then B can draw upon A's ratings to decide whether or not to read the message.

However, there are problems with traditional systems which rate messages:

When users see their messages rated, for example, 2.3 on a scale of 1 to 10, they are forced to either lose respect for the opinions of the system, or to lose respect for their own writing. Not surprisingly, most users end up losing respect for the system.

Traditional systems are all talk and no action; the system herein described facilitates the translation of ideas into commitments, and commitments into fulfilled commitments.

Traditional systems don't distinguish between people who contribute to a community and those who do; this new system creates the possibility of people getting greater attention from others as a result of their contributions toward a shared end.

Traditional systems that do include message ratings typically communicate a predicted rating of a message for an individual user, instead of the value of the message to the group as a whole. When the rating of a particular message is examined, it isn't obvious how many people have contributed to that rating. It could be five other people, or five thousand. Therefore, the predicted rating can be misleading to the group, and de-motivating to the author of a particular message. In addition, if one wishes to distribute awards to members of a discussion group based upon the value of their contributions, with such systems it isn't clear how to distribute said awards.

What is needed is a system and methodology that addresses and overcomes these problems.

SUMMARY OF THE INVENTION

According to the invention, in an interactive electronic communication environment, incentives for positive contributive behavior are provided to authors and respondents who behave in a desired manner as determined by the system in order to facilitate the shared pursuit of common interests. The incentives are in the form of tokens of appreciation or value units denominated as points. In one embodiment, the points are converted into awards or other forms of public and personal recognition.

It is to be recognized that the true value of an action such as posting a message to a group is derived from the degree of appreciation shown by other users, rather than by a weighted average of ratings made by other users. The difference between points according to the invention and ratings of the prior art is analogous to the difference between money and grades. Money represents exchangeable value, while grades typically represent the evaluation of a single item by a single individual based upon criteria for success.

This invention features a system and method for accumulating and communicating points relative to a user based upon the evaluation of the value of that users' actions.

It is a goal of this invention to provide a system and method of authenticating and acknowledging, for each user amongst a group of users, that the user's behavior is contributory to the group, and the degree to which such behavior is contributory.

It is a further goal of this invention to provide such a system and method which accumulate and communicate points representing the value of variously proposing, committing to, and completing or failing to complete actions in a discussion group.

It is a further goal of this invention to divide members of a discussion group into subgroups based upon their degree of success in fulfilling shared interest as measured by said points.

It is a further goal of this invention to further divide groups into subgroups based upon the degree of shared interest shown by a particular subgroup. For example, if 5 people out of 30 all rate each others' messages highly, they can be placed in a subgroup together.

It is therefore a goal of this invention to provide a system and method which accumulate and communicate points representing the value of posting a message to other users in a discussion group.

It is a further goal of this invention to provide such a system and method which accumulate and communicate points representing the value of rating another user's message in a discussion group, for example by comparing said ratings to the ratings of others.

It is a further goal of this invention to facilitate the selective communication of said points to other users. For example, users can select who can tell how many points they have accumulated.

It is a further goal of this invention to selectively propagate messages to be viewable by additional users in a discussion group based upon that message reaching a threshold of value to the group.

By rewarding positive behavior, the system resolves the common problems which typically plague discussion groups, such as commercial advertisements, or prolonged and inflammatory discussions not of interest to the group as a whole. Instead of being encouraged to attract attention, users are encouraged to contribute actions, experiences, and answers to questions which other users find valuable.

Consider a system in which 1 point is awarded to the author of a message which is merely read, 10 points are awarded to the author when a reader actively rates a message as "good", and 25 points are awarded for each reader who rates the message "excellent." Then a score of 1,000 points represents substantial interest in the message, corresponding anywhere from 40 people rating excellent, to 100 people rating it "good", to 1,000 people simply reading the message. Even if a message is not liked by the majority, if the author finds a significant audience which values the message, he or she will be rewarded for his or her effort in posting the message. This, in contrast to the demoralizing situation where the author's message is rated on a scale of 1 to 10, and found to be a mere 2.3.

Other object, features, and advantages will occur from the following description of the preferred embodiment and the accompanying drawings.

DESCRIPTION OF SPECIFIC EMBODIMENTS

System Hardware

Figure 1:
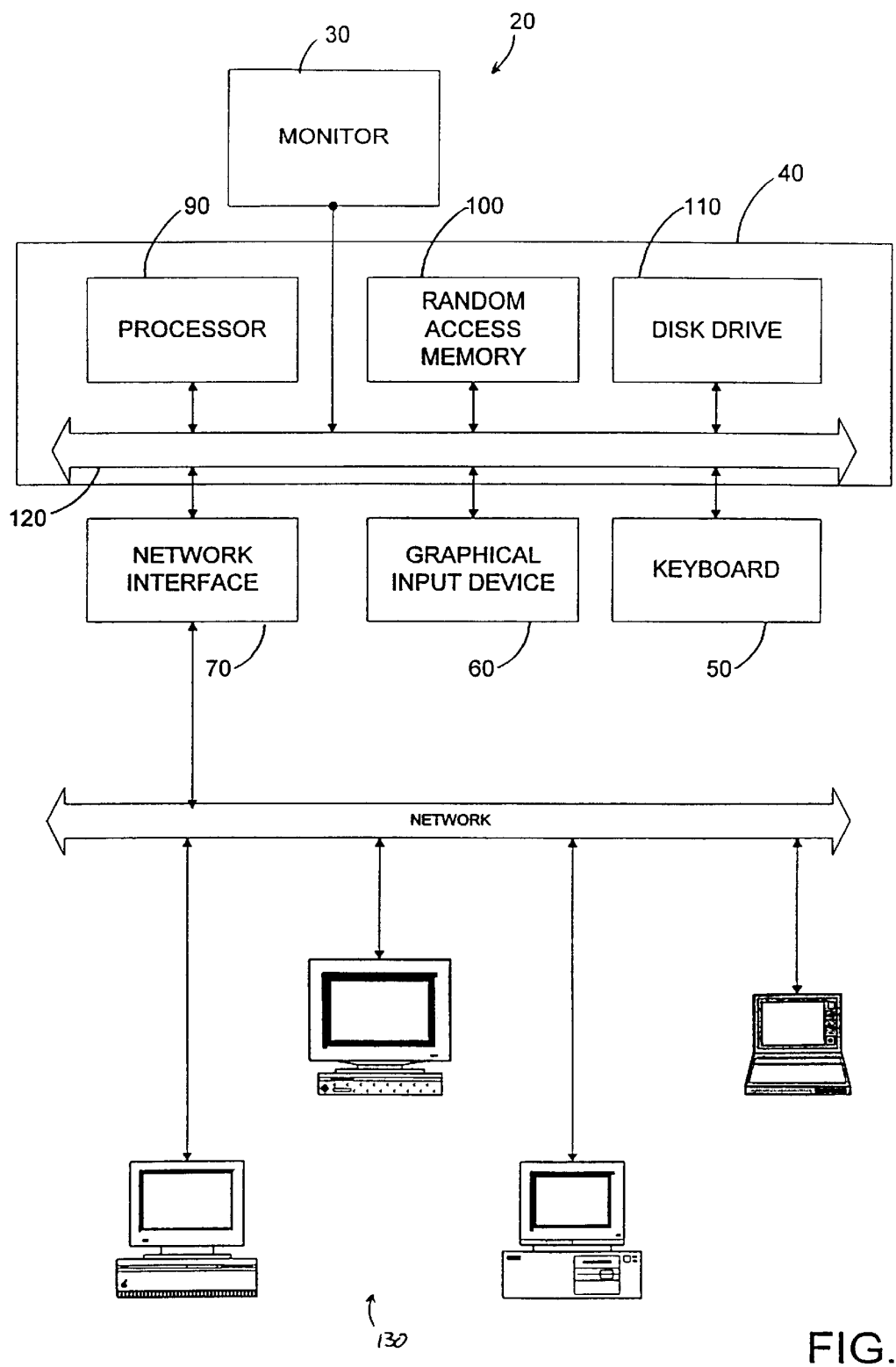
FIG. 1 is a schematic block diagram of a system according to this invention.

FIG. 1 is a block diagram of a system 20 according to a preferred embodiment of the present invention. System 20 includes a monitor 30, a computer 40, a keyboard 50, a graphical input device (for example a mouse) 60, and a network interface card 70. Computer 40 includes familiar computer components such as a processor 90, and memory storage devices, such as a random access memory (RAM) 100, a disk drive 110, and a system bus 120 interconnecting the above components.

A mouse is an example of a suitable graphical input device 60, also known as a pointing device; a digitizing tablet is another. RAM 100 and disk drive 110 are examples of tangible media for storage of computer programs, other types of tangible media include floppy disks, removable hard disks, optical storage media such as CD-ROMS and bar codes, semiconductor memories such as flash memories, read-only memories (ROMS), ASICs, and battery-backed volatile memories, and the like. Network interface card 70 may be any conventional interface means such as a modem, an Ethernet interface card, or a cable modem.

In a preferred embodiment, System 20 includes an Intel Pentium microprocessor-class based computer running a Microsoft Windows operating system, and software herein described in greater detail in connection with the following figures.

As illustrated in FIG. 1, any number of users using computers 130 can be coupled to system 20 via any conventional network in order to read and classify messages resident on system 20. In the preferred embodiment, users using computers 130 communicate to system 20 via an Internet browser such as Netscape Navigator using the TCP/IP communications protocol.

FIG. 1 is representative of but one type of embodiment of the present invention. It will be readily apparent to one of ordinary skill in the art that many system types and configurations are suitable for use in conjunction with the preferred embodiment of the present invention.

Operation of the System

Figure 2:
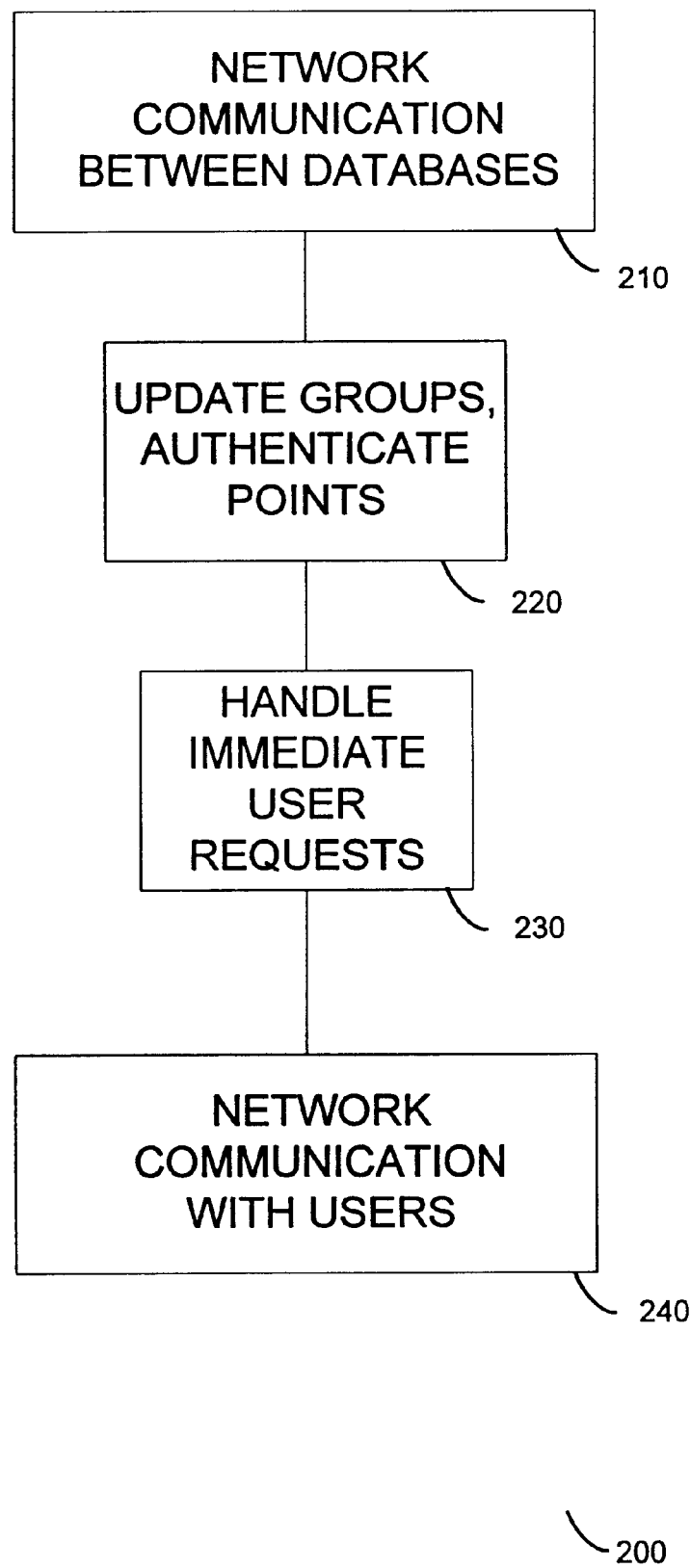
FIG. 2 is a flow chart of the operation of the system.

The operation of system 20 is illustrated in FIG. 2. In the preferred embodiment, the system stores messages and information about those messages (such as a message's author and points associated with a message) in databases distributed over a computer network. The system compiles the messages, and the information about the messages, from the various databases in step 210.

Having collected the messages and information about the messages in step 210, the system examines and responds to classifications of messages in step 220. For each message classification, the system updates points for both the message and the classifier (the user of the system who classified the message), as described later in FIG. 5.

The system then uses the new points to divide the system's users into groups based on the similarity of their classifications, so that users in the same group have tended to provide similar classifications for messages.

In step 700, the system divides the users into groups as described in connection with FIG. 7.

User Interface

In step 230, the system receives and processes users' requests for messages in light of the classification of the messages as described above, and then returns the appropriate messages, step 240.

Figure 3:
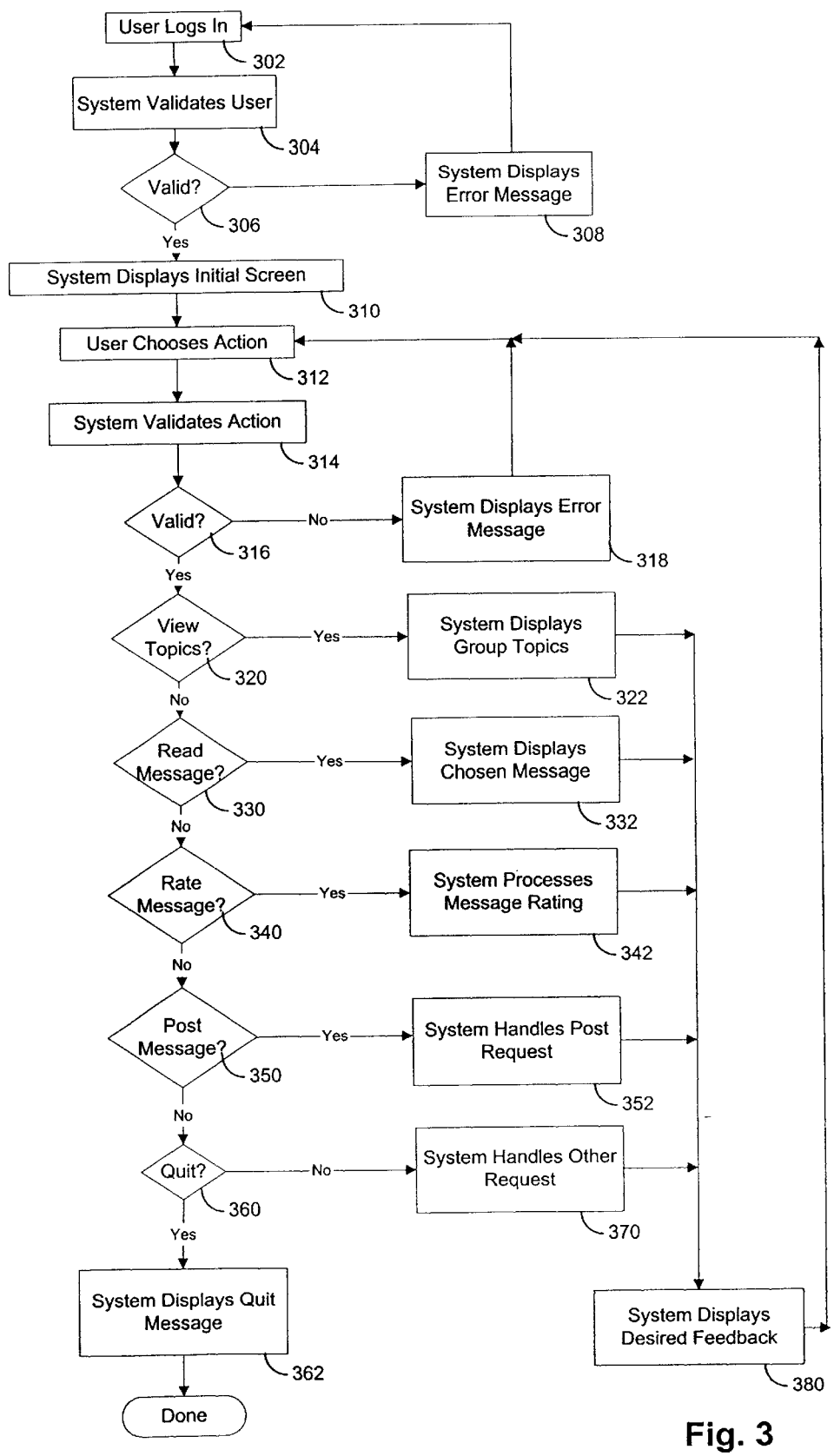
FIG. 3 is a flow chart of the use of the system of FIG. 1. by a user and the response of the system.

The interface between the user and the system 20 is shown in FIG. 3. The user attempts to log on, step 302, and the system validates the user's name and password, step 304. If the user is not validated, step 306, the system provides an error message, step 308, and allows the user to make another attempt at logging in, step 302.

If the system validates the user, the system displays an initial screen for the user, step 310. This initial screen allows the user several options; for example, the user can choose to view the topics of a particular discussion group. In step 312, the user chooses his or her desired action and the system validates that the user is authorized to perform the action, step 314. If the system determines in step 316 that the user is not authorized to perform the action, the system displays and error message, step 318, and allows the user to make another attempt at choosing an action, step 312.

If the system determines in step 316 that the user is authorized to perform the selected action, the system responds in accordance with the action selected:

If the user selected to view a particular discussion group, step 320, the system selects topics from the discussion group and displays them to the user, step 322. The process for selecting and displaying topics is discussed more fully in FIG. 4.

If the user selected to read a particular message from a discussion group, step 330, the system displays the selected message, step 332.

If the user selected to classify a message, step 340, the system processes the user's classification, step 342. The method for processing a user's classification for a particular message is described in more detail in FIG. 5.

If the user selected to post a message, step 350, the system handles the request, step 352.

If the user selected to quit the system, step 360, the system displays a final message, step 362, and the user is logged off the system.

If the user selected any other action, such as handling system administration tasks, changing views, choosing to allow others to see how many points they have, and so on, the system responds to the request in step 370. Normally, users don't see the number of points other users have, nor do messages show the number of points which they have accumulated. Normally, each user just sees their total number of points. Step 370 allows users to change these defaults so that other users can see how many points they have.

For any action that the user selects (except the quit action), the system can display appropriate feedback, step 380. This feedback typically consists of the number of points which the user earned by performing the action they just performed. If the user classified a message, they are shown how many acknowledgment points they have gained (such points are subject to authentication, depending upon the satisfactory conclusion of a process which detects patterns of abuse). If the system performed the authentication and has not yet shown the user the results, step 380 is also the step during which the system communicates the results. Step 380 is also the step during which the system communicates the number of points which the user has earned for posting a message and getting the number of positive classifications which this specific user has received so far.

Selecting Group Discussion Topics to Display

Figure 4:
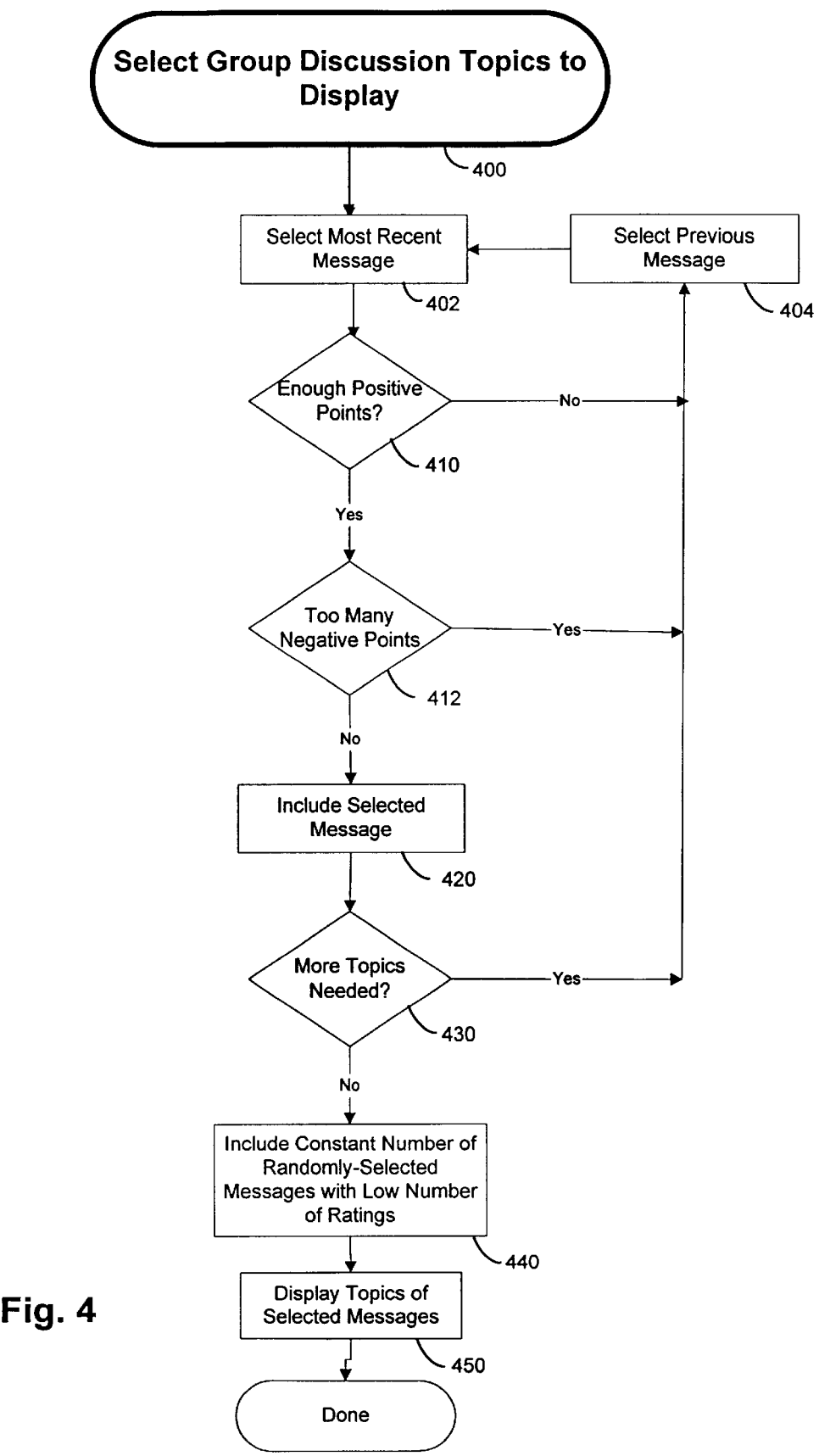
FIG. 4 is a flow chart of the method for selecting discussion topics to display to a user.

As shown in FIG. 3, when a user chooses to view a particular discussion group, the system selects messages from the discussion group and displays the topics of the selected messages to the user. FIG. 4 shows the method of the system for selecting which messages to display to a particular user 400.

In step 402, the system selects the most recent message posted to the chosen discussion group. The system includes the message, step 420, if the message has exceeded a given threshold of positive points, step 410, without exceeding a second threshold of negative points, step 412.

If at this point the system has not included enough messages to display to the user, then the system selects the next most recent message posted to the discussion group, step 404, and determines if that message should be included (step 410, step 412, and step 420).

When the system has found enough messages to include, step 430, it then adds in step 440 a given constant number of new messages which have not been rated by very many users. In step 450, the system displays to the user the topics of all the included messages.

Processing a Message Rating

Figure 5:
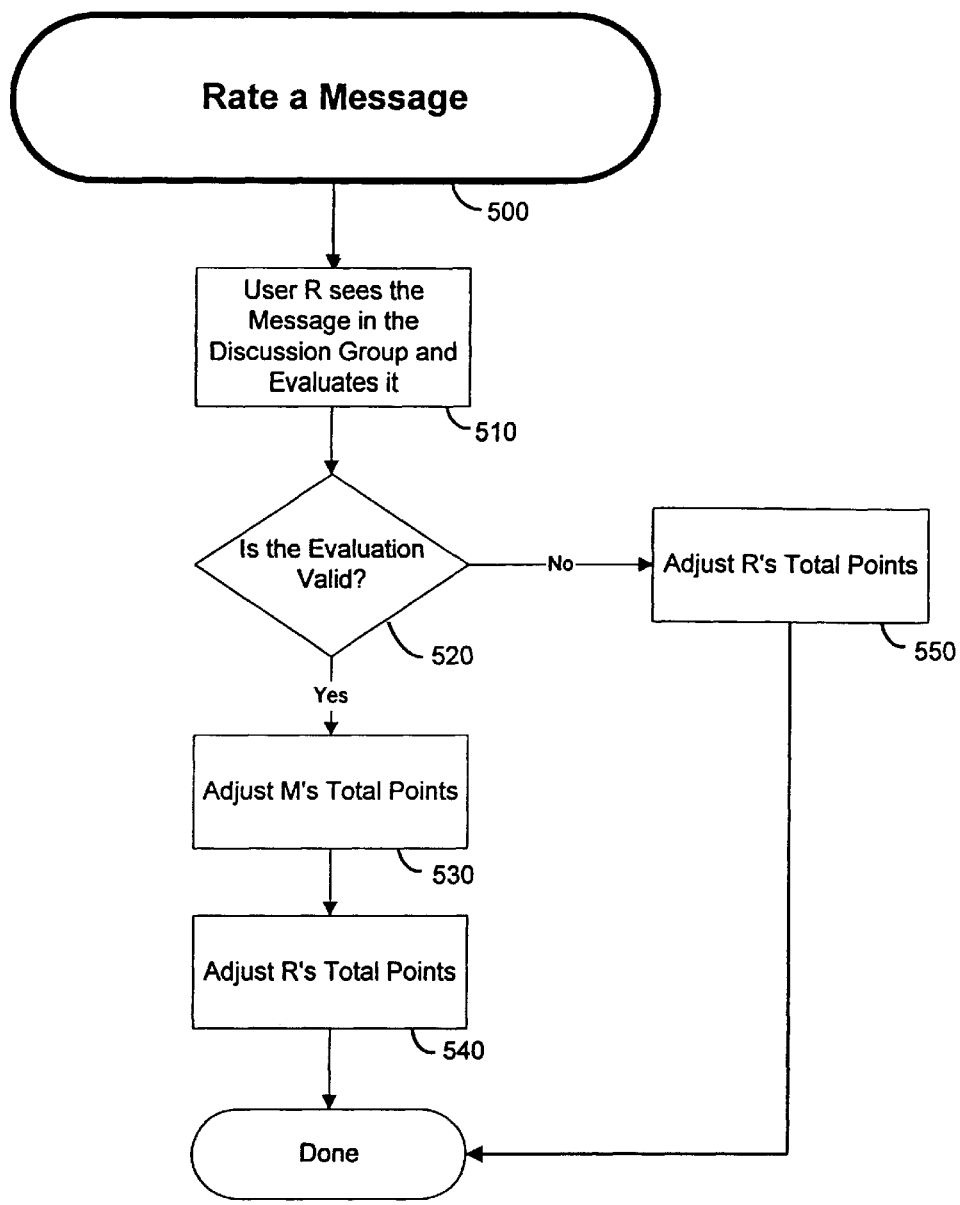
FIG. 5 is a flow chart of the method for updating points in response to a posting or the specification of utility of a message in the system.

FIG. 5. is a flow chart depicting a preferred embodiment of a method for exchanging points in response to a posting or the specification of utility of a message 500 in the system 200. Users typically start with 0 points. In step 352, user M posts a message to the discussion group using a protocol such as NNTP as used by the Usenet messaging system on the Internet. In step 510, another user, which we refer to here as user R, sees the message in the discussion group and classifies the message. In the preferred embodiment, R clicks a radio button classifying the message as "Thanks A Lot," "Thanks," and "No Thanks." In alternate embodiments, these classifications could be different, or further subdivided into more specific classifications. For example, "No Thanks" might be divided into "SPAM," "FLAME," and "FAQ," corresponding to unwanted marketing messages, inflammatory debates of little use to the group as a whole, and frequently asked questions answered in another document.

In step 520, R's classification of the message is validated. In a current embodiment, validity is checked in a batch process which runs overnight and, for each user, classifies the user who rated elements into one of 3 categories:

(1) they rated messages and the ratings had a positive correlation with the ratings from others in their group;

(2) they fit into clear abuse categories, such as rating every message negatively, or every message positively, or in a way which has no correlation to any other group of users (random); and (3) everyone else.

The system then looks at the IP addresses of all category 2 users and sees if all users from that IP address are in category 2 or category 3; if this is the case, then all users from that IP address are classified as category 2.

Users in category 1 get a constant number of points added to their accounts and to the accounts of the people posting the messages based upon the rating. Users in category 3 have the same process take place with 1/3 the normal number of points. Users in category 2 get no points, nor do the people whose messages they rated get any points.

If R's evaluations are determined to be degenerate, then the validation of R's evaluation in step 520 fails. If step 520 determines that the evaluation is valid then control passes to step 530, where M's total points are adjusted based upon the feedback supplied by user R. In the preferred embodiment, user M receives 0.010 points each time another user reads a message posted by M; M receives 0.083 points for each "Thanks a Lot" rating which another user supplies; user M receives 0.042 points for each "Thanks" rating which another user supplies. Note that in the preferred embodiment M doesn't lose points when R classifies M's message as "No Thanks", but messages which have many "No Thanks" classifications aren't likely to be propagated to very many users. In step 540, R receives 0.042 points for providing a validated classification of a message.

If step 520 determines that R's classification is not valid, then in the preferred embodiment in step 550 R receives 0.001 points for rating the message.

Message Modification for Action-Related Messages

Figure 6:
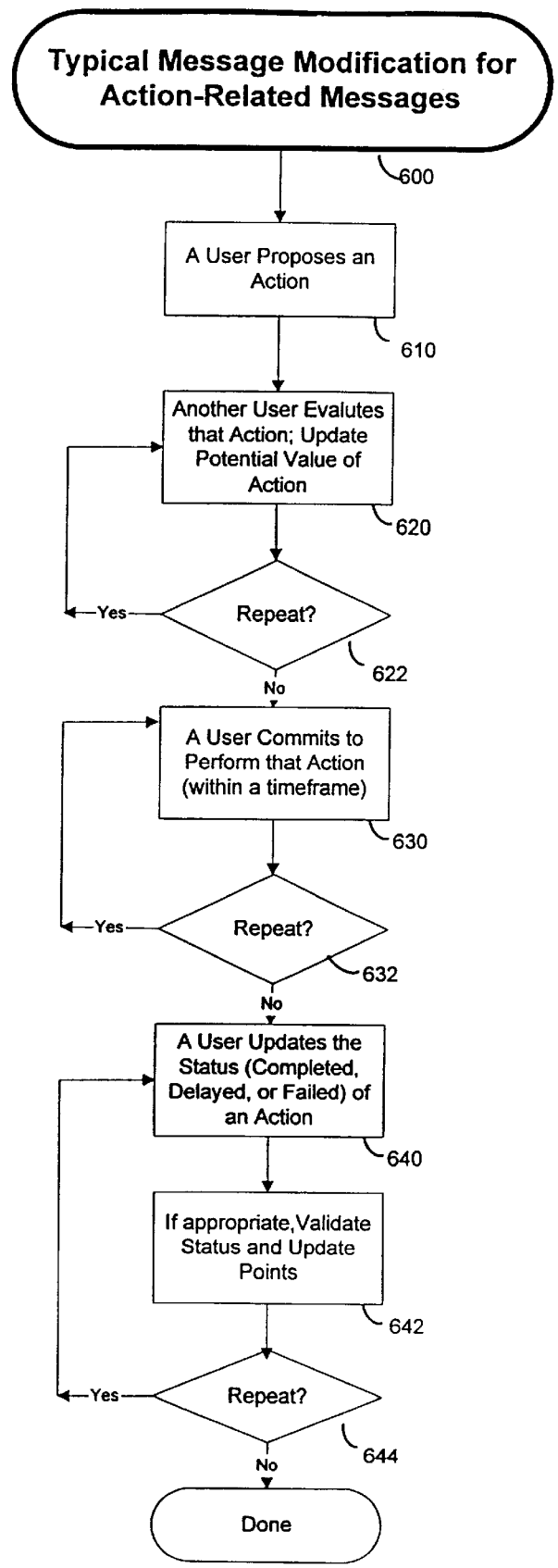
FIG. 6 is a flow chart of the method for updating points to acknowledge the proposal and completion of actions in the system.

In a preferred embodiment, FIG. 6 is a flow chart depicting a method 600 for updating points to acknowledge the proposal and completion of actions in the system. In step 610, a user proposes an action; this is similar to posting a message in a traditional discussion group using a protocol such as the NNTP protocol used in Usenet. In steps 620 and 622, users classify the proposed action, indicating the degree of value they believe it to have. In the preferred embodiment, they do this by indicating the number of points corresponding to the degree of shared interest they perceive as being fulfilled as the action takes place. In steps 630 and 632, if a user decides that it is worth it to perform the action, they select a mechanism for validating the action's success and they commit to a timeline for completion. In the preferred embodiment, the validation process is decided ahead of time to be one of the following: either the action owner's word is used, or a specific other person classifies the action's completeness, or a subset of people drawn at random from a group are chosen to validate the action. In all cases, the number of points to be awarded for performing the validation is also indicated in the action, and is taken from the total number of points assigned to the task by the group.

The action describes which other users can participate in the action and also receive points; for example, an action may be to write three pages about the environment, and up to any four people in the discussion group can participate.

In step 640, users update the status of actions as being delayed, completed, or failed. If the deadline passes with no additional information from a user, then the action is declared to have failed. If the action status is completed, then the validation process which was selected in step 630 is used to determine if the action has actually been completed. If the action has been completed, then in the preferred embodiment the average number of points which were awarded in steps 620 and 622 are added to the totals of the users who participated in the action, step 642. The above process may be repeated if the user wishes to update status for additional actions, step 644.

Grouping by Similarity

Figure 7:
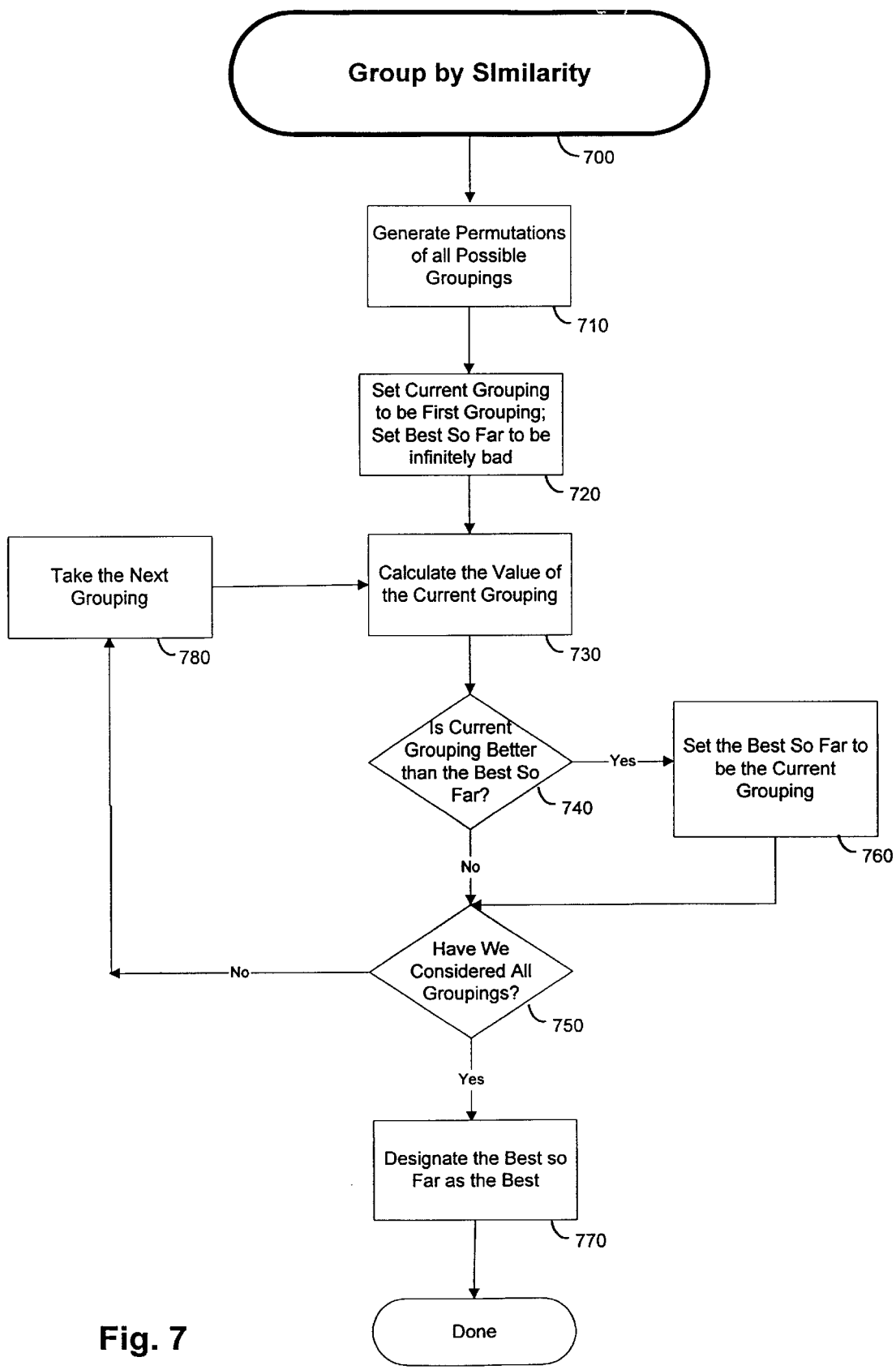
FIG. 7 is a flow chart of the method for grouping system users by similarity.

In the preferred embodiment, the system divides users into groups according to the procedure illustrated in FIG. 7. The member predicate, Member (memberX, groupY), is true or false depending upon whether or not member X is a member of group Y; Member X is a user or a group id; group Y is a group id.

A valid grouping has each member in at least one group, and all such groups are either directly or indirectly members of a single root group. No group has 0 members, and no group has a subgroup as its only member.

Similarity between two users is defined as a value between 0 and 1 based on summing the square of the difference between each set of classifications (from 0 to 1) made on the same message. Thus similarity values close to 0 indicate that the users have rated the same messages similarly, and values close to 1 indicate that the users have rated messages differently.

User-to-user proximity, on the other hand, is measured by a notion of transitivity: if Member (user1, group1) and Member (user2, group1) then their proximity is 0. If that's not the case, but:
Member (user1, groupA) &
Member (user2, groupB) &
Member (groupA, groupC) &
Member (groupB, groupC)
then their proximity is 1. That is, if two users belong to two different groups, but those two groups are subgroups of the same group, then the proximity of the two users is defined to be 1.

If neither of the first two conditions hold, but:
Member (user1, groupA) &
Member (user2, groupB) &
Member (groupA, groupC) &
Member (groupB, groupD) &
Member (groupC, groupE) &
Member (groupD, groupE)
then their proximity is 2; and so on.

Given k users with $k^2$ pair-wise results of applying the similarity criteria, one can measure the aggregate similarity (and thus how good a grouping is) by taking the total that results from taking each pair of users and multiplying their similarity by their proximity.

As illustrated by FIG. 7, users are grouped by similarity 700 by first permuting the set of all possible groupings of users 710 (a maximum depth for the proximity relation is set to keep the list from being infinite; in the preferred embodiment, this maximum depth is 4*log(u) where u is the number of users). The first such grouping is made the current grouping and also the best so far is designated as being extremely poor 720. In step 730, the value of the current grouping is calculated, using the aggregate similarity criteria described in the previous paragraph. If the current grouping is better than the best so far 740, as is always the case the first time through this loop, then it replaces the previously designated best grouping 760.

If the system has not yet considered all the groupings 750, then the system takes the next group 780 and repeats the process until there are no more groupings to consider. Then by step 770 it designates the best so far as the best in the system and this procedure completes. This grouping can then be made the basis for grouping users to predict opinions based upon the opinions of similar others, for forming groups for conversations on common topics of interest, for selecting debating partners (by choosing users who are distant from each other in the grouping tree), for forming groups to achieve shared aims such as cleaning up beaches, and so on.

Summary, Ramifications, and Scope

By facilitating acknowledgement, the invention addresses a key psychological need which is not handled by other message board software. Leon Festinger noted in 1957 that people typically come to value those things in which they freely choose to invest time and energy, and tend not to value things in which they have no direct personal experience. Indeed, he noted that after freely choosing to put effort toward some end, people ask themselves, "Was it worth it?"

In the case of participating on typical message boards, people often regret the time and effort they've expended because they're not sure if their participation has made any difference. By radically lowering the barriers for communicating the appreciation of others, this invention helps people to see the value which their effort has for others, and thus encourages further effort. Additionally, as people gain experience in seeing the value their contributions have to online communities, they value them more, and are likely to value the points which others learn in other message boards.

Thus, as people participate on the system, the points become more than just tokens of appreciation. They become a symbol of the group-based pursuit of interest, unleashing possibilities for facilitating cooperation among many communities. For example, what if many disgruntled customers of a particular corporation got together? What kind of responsive changes could they encourage in the target corporation?

The invention also has implications for the business model associated with the use of the system. In an advertising model, a portion of the advertising revenue paid to the system is allocated to users in a pool based on the distribution of points; for example, users can get mileage points with an airline in exchange for contributing to their community. In the subscription model, people get points immediately upon subscribing; when they acknowledge others, those other people wind up with points. In the donation model, a message is seen by more people because it is associated with a donation to an organization which is considered "friendly" by the discussion group, for example donating to Surfrider Foundation for an ocean-surfing group.

Further consider the case of a group of surfers who care about the quality of ocean water near the shore. They can communicate, discussing problems from careless beach goers, oil tankers, sewage, and other problems. They can agree upon solutions, such as agreeing to clean beaches once or twice a month, and writing letters to politicians to encourage that something be done to protect the ocean and its habitat. Using this system, they can be acknowledged for contributory behavior. Such activism has already occurred on Usenet, the existing message board systems, but much of this community impact has been diminished by the flood of incoherent or useless messages coming onto the systems. By focusing on messages which have value, the system encourages more productive results.

The invention has been explained with reference to specific embodiments. Other embodiments will be apparent to those of ordinary skill in the art. For example, variations as listed below may be incorporated into the invention without departing from its spirit and scope. It is therefore not intended that the invention be limited, except as indicated by the appended claims.

Variations

One variation is a system which simply gives users points for evaluating the messages written by other users.

One variation is to track the reputation of individual authors, and assign further writings from those authors a preliminary rating based upon that reputation.

Another variation is a system that shows a message to a user selected at random from a pool of volunteers; at that point, the user rates the message upon given criteria. The random selection encourages objectivity, something which otherwise can be difficult to achieve.

Another variation is to award points to people whose predictions anticipate the evaluations of others; for example, someone who evaluates a message highly which later becomes highly rated in a discussion group. One can also apply the same technique to products, such as books, movies, and music.

Another variation is a system that displays which of all of the message boards in the invention currently has the most activity, or the greatest increase in momentum of activity. Then users can click around, based on the degree of interest found in different areas. The system could mix a user's interests with the momentum level, and put them on the message board which is likely to be more interesting to the user.

While in the preferred embodiment, actions are validated by the person who signed up for a task indicating that they completed the task, an alternative is to have others selected at random from a pool verify that the task has been completed. Yet another alternative is to assume a task has been completed and to check up only at random while publicizing gain or loss of points, so that a person's reputation is at stake.

To enhance security, users of a discussion group using points can encrypt their messages, using technology which is known to those skilled in the art who focus on encryption. Further, users of a discussion group using points could use digital signatures to guarantee the authenticity of their messages, using technology which is known to those skilled in the art who focus on encryption.

The system can operate with a single server on a single machine being accessed by multiple client web browsers. It can also operate as a set of inter-operating web servers with multiple client browsers. It can also operate as a set of inter-operating web servers with Java or other client-side specialized software packages.

Messages could include HTML, web page references, sound, and graphics. Points could be used to designate something of objective value in the real world, such as money or mileage points.

In addition to the last notion of denoting something of value, the system can automatically process credit card purchases of points.

Instead of using a user name and password, the system can authenticate users based upon "cookies", which are small pieces of information stored by the client's browser which uniquely identify a particular user. Users can also be authenticated by using TCP/IP addresses, either by themselves, or in conjunction with other elements such as passwords and "cookies."

Instead of using a single kind of generic point, the system can have a number of different kinds of points; for example, "green" points might be used for G-rated discussion groups, while controversial or pornographic discussion groups get "red" points. There can be restrictions on which points can be converted into which real-world values, such as discounts on airline tickets, frequent flier miles, and so on.

Digital signatures can also be used to communicate the validity of a user's claim that they have a certain number of points.

Messages can be sorted in order of the most recent message first, or alphabetically, or based upon the author, or based upon how well-rated a message is.

The system can permit users to buy and sell points to each other; as described above, points can come in different varieties, and thus have different exchange rates.

In addition to that same notion of using points to denote value, the system can dedicate a portion of advertising revenue toward assigning value to points, to enhance the degree to which they become tokens of appreciation.

To improve performance, messages can be compressed using compression technologies known to those skilled in the art.

Messages can be conditionally propagated based upon a user's membership in a group. For example, users belonging to the "surfer's" group might have exclusive access to messages about surfing at Maverick's.

Instead of strictly following the sequence depicted in FIG. 6, individuals can update the status of a proposed action at any time; for example, they can skip committing to an action and indicate that they had already performed the action. The method for determining a user's points can constrain the system so that one can only gain points. The method can also be constrained so that a user loses points and has to purchase more. The method can also be constrained so that users both gain and lose points.

Users can choose to break into groups based upon characteristics which they voluntarily share with a group of other users. Users can store information about themselves on the system, including pictures of themselves, and the recorded sound of their voices. People can be required to pay a penalty in the case that they post a message which falls below a certain criteria.

Relating to step 510, users can specify the utility of a message in additional ways. For example, by clicking on a position on a bar corresponding to a range between "low utility" and "high utility". A user can also evaluate a message based upon its key attribute; for example, "inflammatory", "an advertisement", "a redundant question", or "useful". A user can also evaluate a message based upon the degree to which they appreciate the message. Instead of handling a few thousand message boards, the invention can handle literally millions of message boards, restricting or permitting access to each one.

What is claimed is:

1. In an interactive electronic communication environment in which users exchange electronic messages, a method for encouraging cooperation among users to facilitate a shared pursuit of common interests comprises:
   receiving for posting a message by a posting user; thereafter
   issuing the posted message to potentially interested users;
   receiving a rejoinder message to the posted message from a responding user, wherein the rejoinder message includes an appropriateness rating for the posted message assigned by the responding user;
   evaluating validity of the appropriateness rating for the posted message assigned by the responding user;
   awarding a value unit to the responding user in response to the validity of the appropriateness rating for the posted message assigned by the responding user;
   determining updated value units for the responding user in response to the value unit;
   thereafter awarding value units to the posting user based on the appropriateness rating; and
   publicizing the posted message with the value units credited to the posting user.

2. The method according to claim 1 further including:
   publicizing the updated value units for the responding user.

3. The method according to claim 1 further including:
   wherein the value unit awarded to the responding user is higher when the appropriateness rating is higher.

4. The method according to claim 1 further including:
   accumulating all of the value units in a central storage means on account for the posting user and the responding user.

5. The method according to claim 1 wherein the value unit has an associated economic value.

6. The method according to claim 5 wherein the associated economic value is derived from advertising revenues.

7. The method according to claim 5 wherein the associated economic value is derived from subscription revenues provided by users.

8. In an interactive electronic communication environment in which users exchange electronic messages, a method for encouraging cooperation among users to facilitate a shared pursuit of common interests comprises:
   receiving for posting a message by a posting user; thereafter
   issuing the posted message to potentially interested users;
   receiving rejoinder messages to the posted message from responding users, wherein each of the rejoinder messages contains an appropriateness rating of the posted message assigned by the responding users;
   determining if the appropriateness ratings assigned by the responding users are valid;
   thereafter for the appropriateness ratings assigned by the responding users that are valid, awarding value units to the posting user based on an accumulation of the appropriateness ratings; and
   segregating the responding users into groups according to interests expressed through appropriateness ratings assigned by the responding users to selected posted messages.

9. The method according to claim 8 further including:
   publicizing the posted message with the value units credited to the posting user.

10. The method according to claim 8 wherein determining if the appropriateness ratings assigned by the responding users are valid comprises testing for likely authenticity of each appropriateness rating from the appropriateness ratings assigned by the responding users.

11. The method according to claim 8 further including:
    accumulating all of the value units in a central storage means on account for the posting user and the responding users.

12. The method according to claim 8 wherein the value units have an associated economic value.

13. The method according to claim 12 wherein the associated economic value are derived from advertising revenues.

14. The method according to claim 12 wherein the associated economic value are derived from subscription revenues provided by users.

15. In an interactive electronic communication environment in which users exchange electronic messages, an apparatus for encouraging cooperation among users to facilitate a shared pursuit of common interests comprising:
    means for receiving a message by a posting user;
    means for issuing the message to potentially interested users as a posted message;
    means for receiving rejoinder messages to the posted message from responding users, wherein each of the rejoinder messages contains an appropriateness rating of the posted message;

means for evaluating validity of each of the appropriateness ratings;

means for awarding value units to the responding users in response to the evaluation of the validity of each of the appropriateness ratings;

means for awarding value units to the posting user based on an accumulation of the appropriateness ratings; means for updating value units for the posting user in response to the value units awarded to the posting user; and means for publicizing the posted message with the value units credited to the posting user.

16. A computer server comprises:

a processor; and a tangible memory coupled to the processor, the tangible memory comprising:

code that directs the processor to receive for posting a message by a posting user;

code that directs the processor to issue the posted message to potentially interested users;

code that directs the processor to receive rejoinder messages to the posted message from responding users, wherein each of the rejoinder messages contains an appropriateness rating of the posted message assigned by the responding users;

code that directs the processor to determine if the appropriateness ratings assigned by the responding users are valid;

code that directs the processor to award value units to the posting user based on an accumulation of the appropriateness ratings assigned by the responding users that are valid; and code that directs the processor to segregate the responding users into groups according to interests expressed through appropriateness ratings assigned by the responding users to selected posted messages.

17. The computer system according to claim 16 wherein the tangible memory further includes code that directs the processor to output the posted message with the value units credited to the posting user.

18. The computer system according to claim 16 wherein the tangible memory further includes code that directs the processor to store all of the value units for the posting user and the responding users.

19. The computer system according to claim 16 wherein the value units have an associated economic value.

20. The computer system according to claim 19 wherein the associated economic value are derived from advertising revenues.

\* \* \* \* \*